(12) United States Patent
Twelves, Jr. et al.

(10) Patent No.: US 10,688,588 B2
(45) Date of Patent: Jun. 23, 2020

(54) CONTINUOUS FEED SPINDLE ATTACHMENT

(71) Applicant: United Technologies Corporation, Farmington, CT (US)

(72) Inventors: Wendell V. Twelves, Jr., Glastonbury, CT (US); Tahany Ibrahim El-Wardany, Bloomfield, CT (US); Sergey Mironets, Charlotte, NC (US); Ranadip Acharya, Rocky Hill, CT (US); William K. Tredway, Manchester, CT (US); John M. Milton-Benoit, West Suffield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 171 days.

(21) Appl. No.: 15/619,964

(22) Filed: Jun. 12, 2017

(65) Prior Publication Data
US 2018/0354058 A1 Dec. 13, 2018

(51) Int. Cl.
| | |
|---|---|
| *B23K 9/12* | (2006.01) |
| *B33Y 10/00* | (2015.01) |
| *B23K 20/12* | (2006.01) |
| *B23K 9/133* | (2006.01) |
| *B33Y 30/00* | (2015.01) |

(Continued)

(52) U.S. Cl.
CPC ............ *B23K 9/124* (2013.01); *B23K 9/1333* (2013.01); *B23K 9/1336* (2013.01); *B23K 20/122* (2013.01); *B23K 20/128* (2013.01); *B23K 20/1215* (2013.01); *B29C 64/141* (2017.08); *B29C 64/209* (2017.08); *B33Y 10/00* (2014.12); *B33Y 30/00* (2014.12); *B22F 3/105* (2013.01)

(58) Field of Classification Search
None
See application file for complete search history.

(56) References Cited

U.S. PATENT DOCUMENTS

| | | | | |
|---|---|---|---|---|
| 4,323,756 A | * | 4/1982 | Brown | ................... B22F 3/006 219/121.66 |
| 6,144,008 A | * | 11/2000 | Rabinovich | ............. B22F 3/005 219/121.64 |

(Continued)

FOREIGN PATENT DOCUMENTS

| | | |
|---|---|---|
| JP | 2002126882 A | 5/2002 |
| WO | WO2017060893 A1 | 4/2017 |

OTHER PUBLICATIONS

Extended European Search Report for European Patent Application No. 18175853.3, dated Oct. 26, 2018, 5 pages.

*Primary Examiner* — Devang R Patel
(74) *Attorney, Agent, or Firm* — Kinney & Lange, P.A.

(57) ABSTRACT

A rotating tool system attachment on the spindle of a computer numerical control ("CNC") machine includes a rotating assembly mounted on a static assembly. The rotating assembly provides a continuous supply of a wire material for deposition on a substrate during an additive manufacturing process. The rotating assembly includes a material supply housing a feedstock of wire mounted on a rotating spindle and a wire feeder configured to draw the wire from the wire supply and provide the wire for application during the additive manufacturing process. The tool system can be attached to the spindle of CNC machine to provide additive manufacturing capabilities to the CNC machine.

16 Claims, 3 Drawing Sheets

(51) Int. Cl.
    *B29C 64/141*    (2017.01)
    *B29C 64/209*    (2017.01)
    *B22F 3/105*    (2006.01)

(56) References Cited

U.S. PATENT DOCUMENTS

| | | | |
|---|---|---|---|
| 6,457,629 B1* | 10/2002 | White | B23K 20/10 |
| | | | 228/112.1 |
| 6,557,742 B1* | 5/2003 | Bobeczko | B21F 23/002 |
| | | | 226/177 |
| 6,814,823 B1* | 11/2004 | White | B23K 11/0013 |
| | | | 156/73.1 |
| 9,511,445 B2 | 12/2016 | Kandasamy | |
| 10,254,499 B1* | 4/2019 | Cohen | G02B 6/4463 |
| 2008/0202008 A1* | 8/2008 | Asph | B65C 7/00 |
| | | | 40/663 |
| 2009/0200275 A1 | 8/2009 | Twelves, Jr. et al. | |
| 2012/0009339 A1 | 1/2012 | Creehan et al. | |
| 2016/0107265 A1* | 4/2016 | Lin | B23K 9/04 |
| | | | 228/119 |
| 2017/0136567 A1* | 5/2017 | Lahti | B65H 51/10 |
| 2018/0009054 A1* | 1/2018 | Forseth | B23K 26/342 |
| 2018/0326525 A1* | 11/2018 | Ann | B22F 3/105 |

* cited by examiner

CONTINUOUS FEED SPINDLE ATTACHMENT

BACKGROUND

This disclosure relates generally to additive manufacturing. More specifically, this disclosure relates to a tool system that can be attached to the spindle of a milling machine that can be utilized in additive manufacturing.

Additive manufacturing is a process whereby components are manufactured in a layer-by-layer fashion. Additive manufacturing allows complex design features to be incorporated into parts where those complex design features were infeasible with previous manufacturing techniques. One form of additive manufacturing, referred to as solid state additive manufacturing ("SSAM"), involves applying a deposition material to a substrate without requiring the deposition material to undergo a phase change. In friction surfacing additive manufacturing ("FSAM"), which is a form of SSAM, friction and pressure between the deposition material and the substrate cause the deposition material to heat to near its melting point, thereby causing the deposition material to plasticize but not melt. The plasticized deposition material is then applied to the substrate. The layers of deposition material can be machined into a final form.

Computer numerical control ("CNC") machines are automated machine tools controlled by computers that execute pre-programmed sequences of control commands to have the machine tools shape a workpiece. CNC machines remove material from the workpiece, such as through grinding or milling, to shape the workpiece into the final form. CNC machines can include a machine spindle that can attach to various tool attachments to machine the workpiece. The computer is pre-programmed with instructions, and the computer controls the machine spindle and the tool attachment to shape the workpiece. The machine spindle can utilize multiple tool attachments to machine a single workpiece into the final form. The machine spindle can automatically change between multiple tool attachments as the workpiece is shaped.

SUMMARY

According to one aspect of the disclosure, a spindle attachment includes a static assembly and a rotating assembly mounted on and extending through the static assembly. The rotating assembly includes a spindle having an upper end and an application tip, wherein the spindle extends through the static assembly and the application tip projects out of a lower end of the static assembly, the spindle configured to rotate on a spindle axis relative to the static assembly, a material supply mounted on the spindle, and a wire feeder disposed within the spindle, the wire feeder configured to engage a wire extending from the material supply and to draw the wire from the material supply and through the spindle. The wire feeder is configured to provide a continuous supply of wire from the material supply to the application tip during an additive manufacturing process.

According to another aspect of the disclosure, a computer numerical control machine includes a work area configured to house a workpiece to be shaped into a final configuration, a plurality of spindle attachments configured to shape the workpiece, a machine spindle configured to attach to and manipulate a position and rotation of the plurality of spindle attachments, and a controller communicatively connected to the machine spindle, the controller configured to receive and store the final configuration in a memory and to control the machine spindle to shape the workpiece into the final configuration. At least one of the spindle attachments includes a static assembly and a rotating assembly mounted on and extending through the static assembly. The rotating assembly includes a spindle having an upper end and an application tip, wherein the spindle extends through the static assembly and the application tip projects out of a lower end of the static assembly, the spindle configured to rotate on a spindle axis relative to the static assembly, a material supply mounted on the spindle, and a wire feeder disposed within the spindle, the wire feeder configured to engage a wire extending from the material supply and to draw the wire from the material supply and through the spindle. At least one of the spindle attachments is configured to provide a continuous supply of wire from the material supply to the application tip.

According to yet another aspect of the disclosure, a method of depositing a layer of material on a substrate includes feeding a wire of deposition material to an application tip of a spindle from a reel mounted on the spindle, positioning the wire extending from the application tip in a deposition zone and applying a pressure to the wire in the deposition zone, rotating the spindle relative to the substrate to generate frictional heat where the wire contacts the substrate, and traversing the wire across the substrate to thereby deposit a layer of the wire deposition material on the substrate.

DETAILED DESCRIPTION

Figure 1:
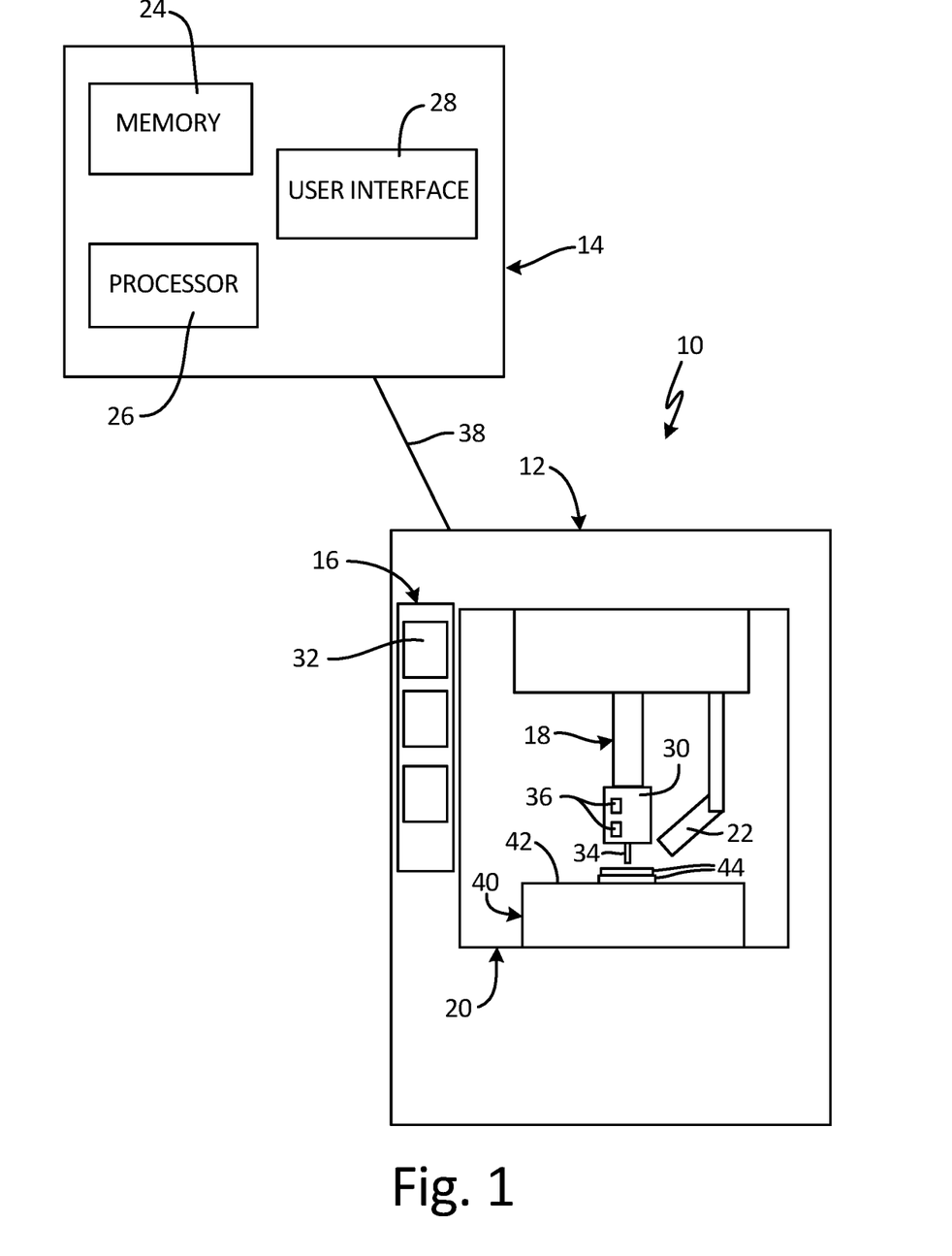
FIG. 1 is a block diagram of a computer numerical control machine system.

FIG. 1 is a block diagram of machine system 10. Machine system 10 includes computer numerical control ("CNC") machine 12 and computer 14. CNC machine 12 includes tool bank 16, machine spindle 18, work area 20, and heating element 22. Computer 14 includes memory 24, processor 26, and user interface 28. Tool bank 16 stores subtractive attachments 32 when not in use and can also store additive attachment 30 when not in use. Additive attachment 30 includes wire 34 and sensors 36.

Computer 14 communicates with CNC machine 12 via communication link 38. Communication link 38 can be a wired or wireless connection, and it is understood that computer 14 can be integrated into CNC machine 12 or disposed separately from CNC machine 12. Processor 26, in one example, is a digital logic circuit capable of executing software or other instructions, for example, stored in memory 24.

Memory 24, in some examples, can be configured to store information during operation of computer 14. Memory 24, in some examples, is computer-readable storage media. In some examples, the computer-readable storage media can include a non-transitory medium, and in some examples can include a volatile medium. In some examples, memory 24 is configured to store program instructions for execution by processor 26.

User interface 28, such as a keyboard, touchscreen, monitor, mouse, or other suitable interface device, allows a user to interact with machine system 10, such as by retrieving information from memory 24, receiving notifications, initiating the software stored in memory 24, and inputting additional information to memory 24, among other examples. User interface 28 can also be configured to provide an output of information to the user. For example, user interface 28 can include a sound card, a video graphics card, a speaker, a display device, or other type of device for outputting information in a form understandable to users or machines.

CNC machine 12 is an automated, multi-axis machine tool utilized to shape workpiece 40 into a desired configuration. CNC machine 12 can be a 3-axis machine, a 5-sided machine, a 5-axis machine, or any other desired configuration, for example. Workpiece 40 is housed in work area 20, and CNC machine 12 can utilize additive attachment 30 and subtractive attachments 32 to shape workpiece 40 into a desired configuration. Substrate 42 is the portion of workpiece 40 that layers of material are deposited on during an additive manufacturing process.

Tool bank 16 can store additive attachment 30 and subtractive attachments 32 when not in use. Both additive attachment 30 and subtractive attachments 32 can be connected to and powered by machine spindle 18 and are configured to shape workpiece into the desired configuration. Additive attachment 30 can add material to substrate 42 on workpiece 40 through an additive manufacturing process. In one example, additive attachment 30 can be configured to add layers 42 of material, such as wire 34, to substrate 42 through a solid state additive manufacturing process, such as friction surfacing additive manufacturing ("FSAM"), for example. Sensors 36 can be disposed in or relative to additive attachment 30 and can be configured to sense various operating characteristics of additive attachment 30, such as an applied load, a temperature of wire 34, or any other desired characteristic. Wire 34 can be of any suitable material for applying to substrate 42 through the FSAM process. For example, wire 34 can be metallic, cermet, plastic, or other matrix materials. In some examples, wire 34 can also include a sheath surrounding a desired particulate material to produce specific matrix composites when wire 34 is bonded to substrate 42 during the FSAM process. Wire 34 can include a metallic sheath surrounding a carbon particulate core, for example. A sheath surrounding a core can effectively lower the melting point of the overall wire 34, such that less friction, and thus a slower rotational speed, is required to plasticize wire 34 for application during the FSAM process. Moreover, wire 34 can be of any desired cross-sectional shape, such as a circle, square, triangle, or any other suitable shape.

Subtractive attachments 32 can remove material from workpiece 40, such as through grinding, milling, or drilling, for example. Machine spindle 18 can utilize both additive attachment 30 and multiple subtractive attachments 32 from tool bank 16, and machine spindle 18 can automatically attach to and detach from both additive attachment 30 and subtractive attachments 32. As such, CNC machine 12 is configured to shape workpiece 40 utilizing various machining attachments and methods.

During an FSAM process, a sacrificial wire or rod of deposition material, such as wire 34, is rotated relative to a substrate, such as substrate 42, and is applied to the substrate with a desired pressure. Friction between the deposition material and the substrate generates heat. The temperature and pressure are controlled, such as by computer 14, to prevent the deposition material from melting and undergoing a phase change. Instead, the heat builds to an FSAM setpoint, which is typically about 70-90% of the melting point of the deposition material. The FSAM setpoint can be any suitable temperature for plasticizing the deposition material and for providing desired properties at an interface between individual layers, such as layers 44, and at an interface between individual layers and the substrate. Plasticizing the deposition material generates a viscoelastic boundary layer at the tip of the sacrificial wire. The sacrificial wire is then traversed across the substrate and deposits a layer of deposition material on the substrate.

The temperature and pressure conditions during the FSAM process lead to an inter-diffusion process resulting in a bond between the plasticized material and the substrate. Because the sacrificial wire does not melt, the sacrificial wire does not undergo a phase transformation and the microstructure gradient of the deposited wire material on the substrate can thus be controlled as a function of the rotational speed, the applied load, and the traverse speed. FSAM thus enables the generation of defect-free parts with high interfacial shear strength and a controlled microstructure gradient that enhances the mechanical hardness of components produced using FSAM. A heating element, such as heating element 22, can be utilized to preheat the sacrificial wire such that less friction and pressure are required to raise the temperature of the sacrificial wire to the FSAM setpoint.

During operation, information regarding the desired configuration of workpiece 40 is input into computer 14, such as via user interface 28, and can be stored in memory 24. Processor 26 can execute the instructions stored in memory 24 to cause CNC machine 12 to shape the workpiece 40. Workpiece 40 is placed in work area 20 and CNC machine 12 is activated. Computer 14 instructs CNC machine 12 to select additive attachment 30 or subtractive attachments 32 from tool bank 16. CNC machine 12 maneuvers machine spindle 18 and machine spindle 18 attaches to additive attachment 30 or subtractive attachment 32. Machine spindle 18 powers the selected one of additive attachment 30 and subtractive attachments 32 to shape workpiece 40.

During operation to add material to substrate 42, computer 14 instructs CNC machine 12 to select additive attachment 30. Machine spindle 18 drives the rotation of additive attachment 30 and positions additive attachment 30 relative to substrate 42. Additive attachment 30 is lowered and wire 34 contacts substrate 42. Machine spindle 18 applies a load to additive attachment 30 thereby applying pressure to wire 34 on substrate 42. When the temperature and pressure of wire 34 are at the FSAM setpoint, which can be sensed by sensors 36, machine spindle 18 traverses relative to workpiece 40 to deposit layers 44 of wire 34 on substrate 42. Computer 14 controls the rotational speed of additive attachment 30, the load applied, and the traverse speed of machine spindle 18 relative to workpiece 40.

The structure of the layers 44 of wire 34 deposited on substrate 42 can be altered by controlling, for example, the rotating speed, the traverse speed, and the applied load. Sensors 36 can provide feedback to computer 14 to allow computer 14 to adjust the operating parameters of machine spindle 18 to thereby control the properties of layers 44. In some examples, sensors 36 can sense the applied load, the heat generated by the FSAM process, the temperature of wire 34, and the pressure on wire 34, among others. Sensors 36 can communicate the information to computer 14 or can utilize the information to control various internal components within additive attachment 30. The material of wire 34 and the material of substrate 42 can be stored in memory 24 and computer 14 can control additive attachment 30 to provide a desired microstructure. For example, computer 14 can be loaded with instructions that, when executed by processor 26, cause CNC machine 12 to alter the rotating speed, traverse speed, and applied load to produce a boundary layer with the desired material properties in the deposition zone. As such, additive attachment 30 and CNC machine 12 allow for online optimization of the processing parameters to provide adequate quality of solid state bonding between wire 34 and substrate 42 for fine feature deposition or repair layers.

With additive attachment 30, CNC machine 12 can be a hybrid additive/subtractive machine that allows for a single machine to complete both additive and subtractive processes on a single workpiece 40. For example, CNC machine 12 can remove material from workpiece 40 using various subtractive attachments 32. CNC machine 12 can also add material to workpiece 40 through an FSAM process with additive attachment 30. CNC machine 12 can machine the material added through the FSAM process into a desired configuration with subtractive attachments 32. As such, CNC machine 12 can both add and subtract material from workpiece 40 to produce workpiece 40 having the desired form.

Additive attachment 30 provides significant advantages. Additive attachment 30 allows any multi-axis CNC machine to function as an additive manufacturing machine. Additive attachment 30 facilitates a relatively simple transition from a subtractive machining tool to a hybrid additive/subtractive machining tool, thereby reducing machine costs and complexity in the manufacturing process. Moreover, enabling a single CNC machine to perform both additive and subtractive tasks enables a single CNC machine to fully shape a workpiece without requiring the user to remove the workpiece and to utilize different machines, thereby simplifying and shortening the manufacturing process. Furthermore, various material parameters can be stored in memory 24, and the material properties of any deposition layer can be customized by controlling one or more of the rotating speed, the traverse speed, and the applied load of the wire on the substrate. Computer 14 can also receive feedback from sensors 36 and adjust the operating parameters, such as rotational speed, traverse speed, and applied load, to alter the properties of the deposited layers.

Figure 2A:
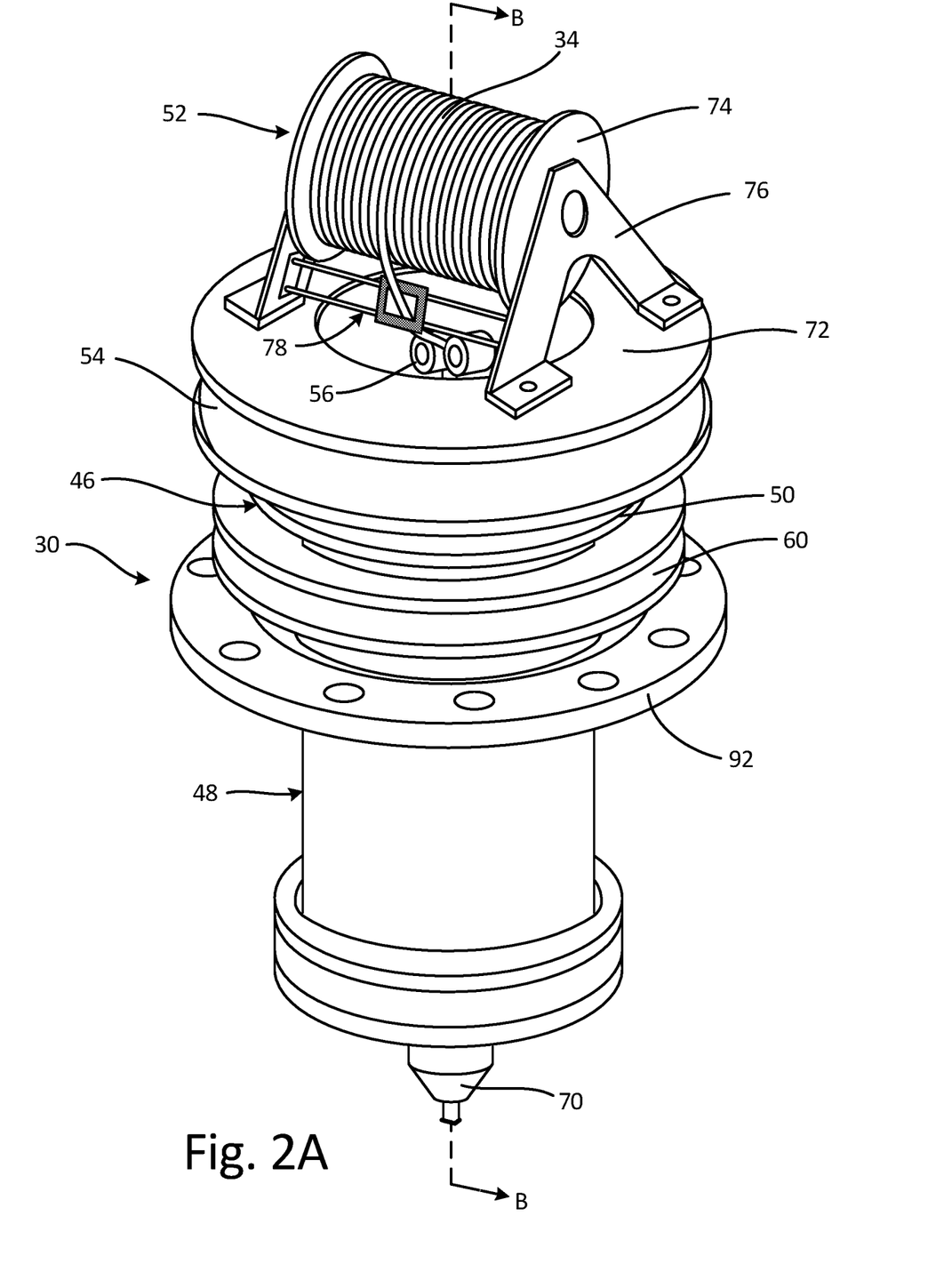
FIG. 2A is a perspective view of a spindle attachment.
Figure 2B:
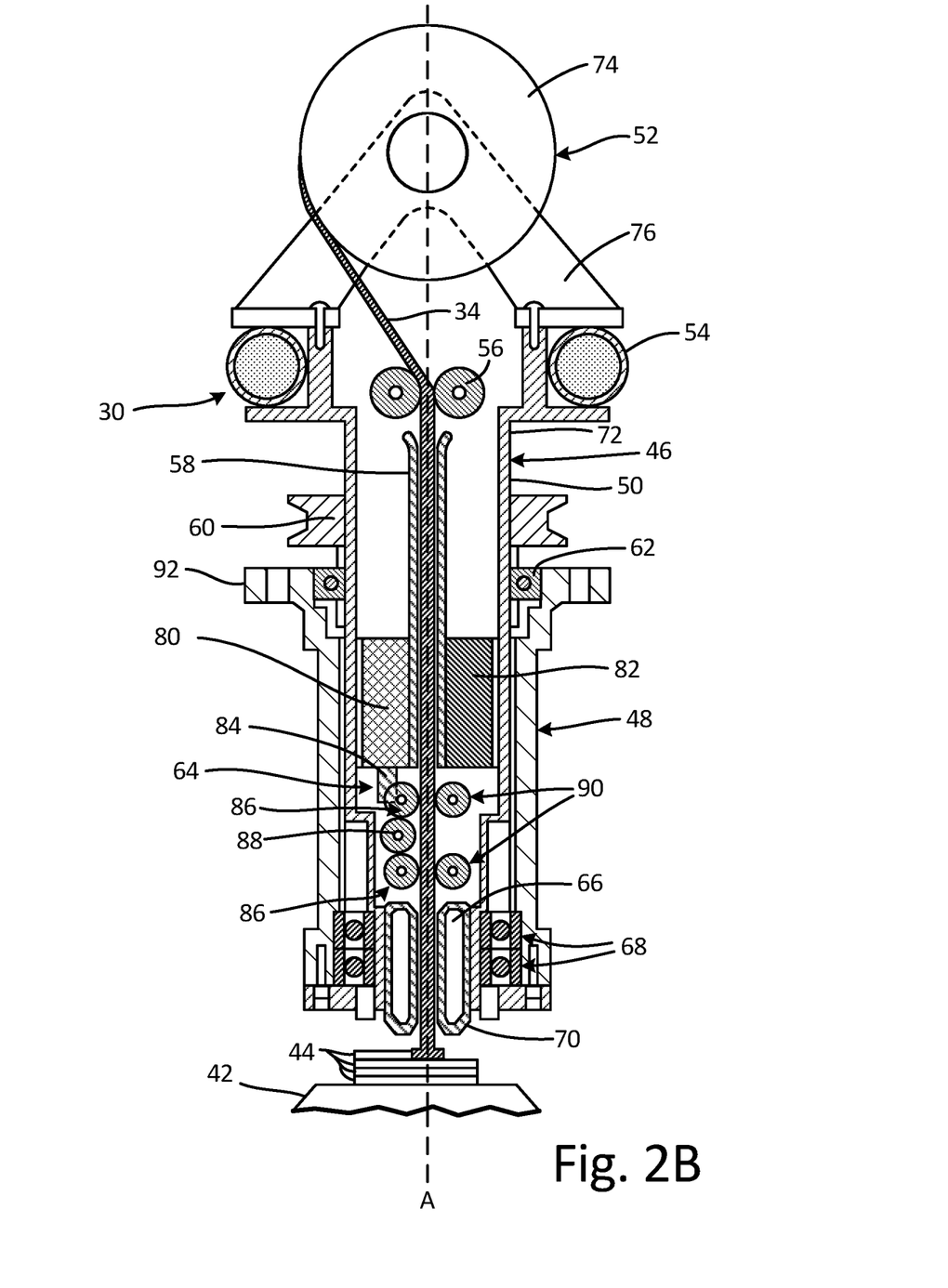
FIG. 2B is a cross-sectional view of the spindle attachment shown in FIG. 2A taken along line B-B in FIG. 2A.

FIG. 2A is a perspective view of additive attachment 30. FIG. 2B is a cross-sectional view of additive attachment 30 taken along line B-B in FIG. 2A. FIGS. 2A and 2B will be discussed together. Additive attachment 30 includes wire 34, rotating assembly 46, and static assembly 48. Rotating assembly 46 includes spindle 50, material supply 52, balance ring 54, guide wheels 56, guide tube 58, drive pulley 60, bearing 62, wire feeder 64, cooling jacket 66, and angular bearings 68. Spindle 50 includes application tip 70 and upper portion 72. Material supply 52 includes reel 74, mount bracket 76, and follower 78. Wire feeder 64 includes motor 80, balance weight 82, transmission gear 84, feeder wheels 86, intermediate gear 88, and idler wheels 90. Static assembly 48 includes mounting flange 92.

Rotating assembly 46 is rotatably mounted on static assembly 48. Mounting flange 92 extends radially from static assembly 48 and can be used to attach additive attachment 30 to a machine for use. Spindle 50 extends through static assembly 48, and application tip 70 projects out of a lower end of static assembly 48. Bearing 62 is disposed between spindle 50 and static assembly 48 and supports rotating assembly 46 for rotation relative to static assembly 48. In some examples, bearing 62 radially supports spindle 50 relative to axis A-A, but it is understood that bearing 62 can provide radial support, axial support, or both. Angular bearings 68 are disposed between spindle 50 and static assembly 48, with angular bearings 68 disposed proximate application tip 70 of spindle 50. Angular bearings 68 can provide both radial and axial support to spindle 50. Balance ring 54 is mounted on spindle 50 below material supply 52 and is configured to absorb vibrations experienced by additive attachment 30, thereby minimizing any adverse effects that can be caused by the vibrations. Drive pulley 60 is mounted on spindle 50 and can receive a device, such as a belt, chain, clamp, or any other suitable device for rotating drive pulley 60 and thus for driving the rotation of rotating assembly 46.

Material supply 52 is mounted on upper portion 72 of spindle 50 outside of static assembly 48. Mount bracket 76 is connected to upper portion 72 of spindle 50, and reel 74 is rotatably supported by mount bracket 76. Similarly, follower 78 is mounted on mount bracket 76, and follower 78 is configured to guide wire 34 between reel 74 and guide wheels 56. Wire 34 wraps around reel 74 and extends from reel 74, through follower 78, and into spindle 50. Wrapping wire 34 on reel 74 provides a feedstock of wire 34 for use throughout an FSAM process, such that the FSAM process does not require stopping and starting to reload additive attachment 30 with additional wire 34. Material supply 52 provides continuous feeding of wire 34 throughout the FSAM process to allow for uninterrupted deposition of layers 44 of wire 34 on substrate 42. Some materials deposited during the FSAM process can oxidize in the interim if it is required to insert a new rod of material for use in the FSAM process after a previous rod has been consumed. The oxidation can lead to weaker bonding between layers 44. Continuously feeding wire 34 throughout the FSAM process prevents oxidation from occurring on previously deposited layers because the continuous feeding eliminates the need to stop the FSAM process and insert a new rod of material for application to the substrate.

Wire 34 can be of any suitable material for applying to substrate 42 through the FSAM process. For example, wire 34 can be metallic, cermet, or other matrix materials. In some examples, wire 34 can also include a sheath surrounding a desired particulate material to produce specific matrix composites when wire 34 is bonded to substrate 42 during the FSAM process. Wire 34 can include a metallic sheath surrounding a carbon particulate core, for example. A sheath surrounding a core can effectively lower the melting point of the overall wire 34, such that less friction, and thus a slower rotational speed, is required to plasticize wire 34 for application during the FSAM process. Moreover, wire 34 can be of any desired cross-sectional shape, such as a circle, square, triangle, or any other suitable shape.

Guide wheels 56 are disposed in upper portion 72 of spindle 50. Guide tube 58 is disposed within spindle 50 and aligned on axis A-A. Guide wheels 56 align wire 34 within spindle 50 as wire 34 enters spindle 50 from material supply 52. Guide tube 58 maintains the alignment of wire 34 within spindle 50 as wire 34 travels between guide wheels 56 and feeder wheels 86.

Wire feeder 64 is disposed within spindle 50 and configured to control the feed of wire 34 through spindle 50. Motor 80 is mounted within spindle 50 and transmission gear 84 is connected to and powered by motor 80. In some examples motor 80 is an electric motor. In some examples, motor 80 is connected to and controlled by computer 14 (shown in FIG. 1). Balance weight 82 is disposed on an opposite side of spindle 50 from motor 80 and is configured to offset a mass of motor 80 to balance spindle 50 during rotation. Transmission gear 84 is connected to and driven by motor 80. Transmission gear 84 meshes with feeder wheels 86 and provides rotational power to feeder wheels 86. Transmission gear 84 can be of any suitable configuration for transmitting power to feeder wheels 86, such as a worm gear or toothed gear, for example. While motor 80 is described as providing rotational power through transmission gear 84, it is understood that motor 80 can provide rotational power in any desired manner, such as through a direct connection with one or more feeder wheels 86 or through any desired form of intermediate gear. In some examples, wire feeder 64 includes multiple, intermeshed feeder wheels 86. Where wire feeder 64 includes multiple feeder wheels 86, it is understood that wire feeder 64 can include intermediate gears, such as intermediate gear 88, between feeder wheels 86 to ensure that feeder wheels 86 all rotate in the same direction. Rotating feeder wheels 86 in the same direction allows feeder wheels 86 to exert a downward force on wire 34 to ensure that wire 34 is properly positioned and adequately fed for application throughout any FSAM process. Idler wheels 90 are disposed on an opposite side of wire 34 from feeder wheels 86 and are configured to ensure wire 34 engages feeder wheels 86.

Feeder wheels 86 can engage wire 34 to pull wire 34 through spindle 50 and to resist torqueing of wire 34 due to the friction generated between wire 34 and substrate 42. Feeder wheels 86 pull wire 34 from reel 74 and provide wire 34 at tip 70 throughout the FSAM process, thereby ensuring that a continuous supply of wire 34 is available throughout the FSAM process. In some examples, feeder wheels 86 can include teeth to engage wire 34. In some examples, feeder wheels 86 and idler wheels 90 can include intermeshed teeth such that rotation of feeder wheels 86 drives the rotation of idler wheels 90, with wire 34 passing between feeder wheels 86 and idler wheels 90 and engaging a second set of teeth. It is understood, however, that feeder wheels 86 can engage wire 34 in any suitable manner. Feeder wheels 86 engaging wire 34 also provides torque resistance to wire 34 to prevent wire 34 from torqueing due to the friction experienced in the FSAM process. Limiting any torqueing of wire 34 to the distance between substrate 42 and feeder wheels 86 prevents wire 34 from being damaged by excess torque. Idler wheels 90 maintain the engagement of wire 34 and feeder wheels 86.

Feeder wheels 86 ensure a short, unsupported length of wire 34 extending to substrate 42, which enables additive attachment 30 to utilize a small-diameter wire for the FSAM process. The short length of wire 34 between feeder wheels 86 and substrate 42 prevents wire 34 from buckling due to the heat and pressure experienced during the FSAM process. Feeder wheels 86 thus allow additive attachment 30 to utilize wires having diameters similar to typical weld wires, such as wires having diameters of about 1.5 mm, for example. Facilitating the use of smaller-diameter wires allows additive attachment 30 to utilize standard, readily available wires for the FSAM process.

Cooling jacket 66 is disposed proximate to tip 70 of spindle 50. After exiting wire feeder 64 wire 34 extends through cooling jacket 66 and exits spindle 50 through tip 70. Cooling jacket 66 can be filled with a cooling substance, such as water, for example, and is positioned to dissipate the heat radiating from wire 34 during the FSAM process. As discussed above, wire 34 is heated to near the melting point of wire 34, such as about 70-90% of the melting point of wire 34, during the FSAM process. Cooling jacket 66 prevents the heat in wire 34 from radiating into additive attachment 30, which could cause damage to various components of additive attachment 30, such as angular bearings 68, for example.

During operation, additive attachment 30 is positioned relative to substrate 42 and spindle 50 is driven to rotate on axis A-A and to apply a layer of wire 34 material on substrate 42. Wire feeder 64 pulls wire 34 from reel 74 and through spindle 50 to position wire 34 outside of tip 70 and into the deposition zone proximate substrate 42. With spindle 50 rotating on axis A-A, additive attachment 30 is lowered towards substrate 42 and wire 34 is applied to substrate 42 with a desired pressure.

Wire feeder 64 continuously provides additional wire 34 for deposition on substrate 42. Feeder wheels 86 drive wire 34 towards tip 70 to assist in maintaining the pressure of wire 34 on substrate 42. Feeder wheels 86 pull wire 34 from reel 74 and position the end of wire 34 at tip 70 such that the end of wire 34 is proximate substrate 42 and positioned to add layers 44 of wire 34 to substrate 42. The feed rate of wire 34 is controlled by motor 80, which supplies rotational power to feeder wheels 86 through transmission gear 84. Transmission gear 84 drives feeder wheels 86, and feeder wheels 86 pull wire 34 from reel 74, through guide wheels 56 and guide tube 58, and push wire 34 out of spindle 50 through tip 70.

The friction and pressure applied to wire 34 cause heat to build at the tip of wire 34. The heat builds until the temperature reaches the FSAM setpoint. Additive attachment 30 traverses substrate 42, and layers 44 of wire 34 are deposited on substrate 42. To generate the heat required to plasticize wire 34 for application during the FSAM process, additive attachment 30 can include a heating element, such as heating element 22 (shown in FIG. 1). The heating element can raise the temperature of wire 34 such that less friction and pressure are required to raise the temperature of wire 34 to the FSAM setpoint. In one example, additive attachment 30 can include an in-situ heating element, such as by conducting electricity through one of feeder wheels 86 or idler wheels 90, to pre-heat wire 34 for application. In some examples, a heating element is disposed outside of additive attachment 30 and focuses energy in the deposition zone to provide additional heat to wire 34. When the temperature of wire 34 reaches the FSAM setpoint, layers 44 can be deposited on substrate 42 through the continued application of pressure and by traversing wire 34 across substrate 42. Layers 44 can be stacked on substrate 42 and can be machined into a final form.

Additive attachment 30 thus provides continuous feeding of wire 34 throughout the FSAM process. Additive attachment 30 is attached to a machine to allow the machine to perform a FSAM process and thereby add layers of material, such as wire 34, to a substrate, such as substrate 42. In some examples, additive attachment 30 is a tool attachment for a multi-axis CNC machine, such as CNC machine 12 (shown in FIG. 1), and is positioned by a machine spindle, such as machine spindle 18 (shown in FIG. 1), and controlled by a computer, such as computer 14. For example, computer 14 can manipulate machine spindle 18 to control the rotational speed, the applied load, and the traverse speed of wire 34 relative to substrate 42. In one example, machine spindle 18 can cause spindle 50 to rotate around axis A-A through drive pulley 60. It is understood, however, that machine spindle 18 can drive the rotation of spindle 50 in any suitable manner. In some examples, spindle 50 is an attachment for an on-site repair machine. For example, spindle 50 can be attached to a manipulator arm and can be used to deposit material on various parts from various angles, thereby allowing an FSAM process to be used for on-site maintenance and repair.

Additive attachment 30 provides significant advantages. Additive attachment 30 provides for continuous feeding of wire 34 throughout the FSAM process. The FSAM process deposits layers 44 of wire 34 on substrate 42 without requiring wire 34 to undergo a phase transformation. By avoiding a phase transformation, the microstructure gradient in the deposition layer can be controlled as a function of rotating speed, traverse speed, and applied load. FSAM further produces porosity-free layers with high interfacial bond strength. As such, FSAM produces defect free components having high interfacial shear strength and a controlled microstructure gradient. Continuously feeding wire 34 throughout the FSAM process eliminates the need to stop manufacturing to insert a new wire, henceforth eliminating oxidation and the weakening of bonds that can occur in previously deposited layers. Moreover, additive attachment 30 provides a short length of unsupported wire 34 outside of spindle 50. The short length of unsupported wire 34 reduces buckling of wire 34 thereby allowing smaller-diameter wires to be utilized for the FSAM process, providing cost savings. In addition, additive attachment 30 can be utilized on any suitable machine such that any machine capable of utilizing subtractive attachments 32 (shown in FIG. 1) can also utilize additive attachment 30 to provide additive manufacturing capabilities. Additive attachment 30 thus reduces costs associated with additive manufacturing as a specialized machine is not required, and reduces the time required to produce a finished part as a single machine can both add and subtract material from substrate 42. Moreover, additive attachment 30 can be utilized for on-site additive repair of parts.

Discussion of Possible Embodiments

The following are non-exclusive descriptions of possible embodiments of the present invention.

A spindle attachment includes a static assembly and a rotating assembly mounted on and extending through the static assembly. The rotating assembly includes a spindle having an upper end and an application tip, wherein the spindle extends through the static assembly and the application tip projects out of a lower end of the static assembly, the spindle configured to rotate on a spindle axis relative to the static assembly, a material supply mounted on the spindle, and a wire feeder disposed within the spindle, the wire feeder configured to engage a wire extending from the material supply and to draw the wire from the material supply and through the spindle. The wire feeder is configured to provide a continuous supply of wire from the material supply to the application tip during an additive manufacturing process.

The spindle attachment of the preceding paragraph can optionally include, additionally and/or alternatively, any one or more of the following features, configurations and/or additional components:

The material supply includes a bracket mounted on the upper end of the spindle, and a reel rotatably supported on the bracket, wherein the wire is disposed on the reel.

A guide roller disposed within the spindle, wherein the wire extends through the guide roller between the reel and the wire feeder.

A guide tube disposed within the spindle between the wire feeder and the guide roller on the spindle axis.

The wire feeder includes a motor and at least one feeder wheel powered by the motor, the at least one feeder wheel configured to engage the wire extending from the material supply and to draw the wire from the material supply and through the spindle.

The wire feeder includes at least one idler wheel disposed on an opposite side of the spindle axis from the at least one feeder wheel, the at least one idler wheel configured to maintain an engagement of the wire and the at least one feeder wheel.

The wire feeder includes a drive gear disposed between the motor and the at least one feeder wheel, the drive gear configured to provide rotational power to the feeder wheel from the motor.

The wire feeder includes a balance weight disposed within the spindle opposite the motor.

An angular bearing disposed between the spindle and the static assembly proximate the application tip of the spindle, wherein the angular bearing is configured to both radially and axially support the spindle.

The spindle includes a cooling jacket disposed at the application tip, the cooling jacket extending around the wire and disposed proximate the angular bearing.

A balance ring extending around the upper portion of the spindle and disposed proximate the material supply.

A drive pulley disposed on a portion of the spindle extending out of the static assembly.

A computer numerical control machine includes a work area configured to house a workpiece to be shaped into a final configuration, a plurality of spindle attachments configured to shape the workpiece, a machine spindle configured to attach to and manipulate a position and rotation of the plurality of spindle attachments, and a controller communicatively connected to the machine spindle, the controller configured to receive and store the final configuration in a memory and to control the machine spindle to shape the workpiece into the final configuration. At least one of the spindle attachments includes a static assembly and a rotating assembly mounted on and extending through the static assembly. The rotating assembly includes a spindle having an upper end and an application tip, wherein the spindle extends through the static assembly and the application tip projects out of a lower end of the static assembly, the spindle configured to rotate on a spindle axis relative to the static assembly, a material supply mounted on the spindle, and a wire feeder disposed within the spindle, the wire feeder configured to engage a wire extending from the material supply and to draw the wire from the material supply and through the spindle. The at least one of the spindle attachments is configured to provide a continuous supply of wire from the material supply to the application tip.

The computer numerical control machine of the preceding paragraph can optionally include, additionally and/or alternatively, any one or more of the following features, configurations and/or additional components:

At least one sensor disposed in the at least one of the spindle attachments, the at least one sensor configured to sense an operating characteristic of the wire and to communicate the operating characteristic to the controller.

The material supply includes a bracket mounted on the upper end of the spindle and a reel rotatably supported on the bracket, wherein the wire is disposed on the reel, a guide roller is disposed within the spindle, a guide tube disposed within the spindle and on the spindle axis between the wire feeder and the guide roller, and the wire extends through the guide roller and the guide tube between the reel and the wire feeder.

The wire feeder includes a motor, at least one feeder wheel powered by the motor, the at least one feeder wheel configured to engage the wire extending from the material supply and to draw the wire from the material supply and through the spindle, and at least one idler wheel disposed on an opposite side of the spindle axis from the at least one feeder wheel, the at least one idler wheel configured to maintain an engagement of the wire and the at least one feeder wheel.

A cooling jacket disposed at the application tip of the spindle, an angular bearing disposed between the spindle and the static assembly proximate the application tip of the spindle, the angular bearing configured to both radially and axially support the spindle, the cooling jacket extends around the wire and is disposed between the wire and the angular bearing.

A method of depositing a layer of material on a substrate includes feeding a wire of deposition material to an application tip of a spindle from a reel mounted on the spindle, positioning the wire extending from the application tip in a deposition zone and applying a pressure to the wire in the deposition zone, rotating the spindle relative to the substrate to generate frictional heat where the wire contacts the substrate, and traversing the wire across the substrate to thereby deposit a layer of the wire deposition material on the substrate.

The method of the preceding paragraph can optionally include, additionally and/or alternatively, any one or more of the following features, configurations and/or additional components:

Engaging the wire with at least one feeder wheel disposed within the spindle, drawing the wire off of the reel with the feeder wheel, and pushing the wire out of the application tip with the feeder wheel.

Aligning the wire of deposition material on a spindle axis with a guide wheel mounted in an upper portion of the spindle, and passing the wire of deposition material through a guide tube disposed between the guide wheel and the at least one feeder wheel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spindle attachment comprising:
   a static assembly; and
   a rotating assembly mounted on and extending through the static assembly, the rotating assembly comprising:
      a spindle having an upper end and an application tip, wherein the spindle extends through the static assembly and the application tip projects out of a lower end of the static assembly, the spindle configured to rotate on a spindle axis relative to the static assembly;
      a material supply mounted on the spindle to rotate with the spindle; and
      a wire feeder disposed within the spindle, the wire feeder configured to engage a wire extending from the material supply and to draw the wire from the material supply through the spindle;
   wherein the spindle is movable along the spindle axis to adjust a position of a portion of the wire extending from the application tip relative to a substrate;
   wherein the spindle is configured to rotate on the spindle axis relative to the static assembly to generate frictional heat between the portion of the wire extending from the application tip and the substrate to cause the wire to plasticize; and
   wherein a cooling jacket is disposed between the wire and an angular bearing and the cooling jacket circumferentially surrounds a portion of the wire coaxial with the spindle axis.

2. The spindle attachment of claim 1, wherein the material supply comprises:
   a bracket mounted on the upper end of the spindle; and
   a reel rotatably supported on the bracket, wherein the wire is disposed on the reel.

3. The spindle attachment of claim 2, further comprising:
   a guide roller disposed within the spindle, wherein the wire extends through the guide roller between the reel and the wire feeder.

4. The spindle attachment of claim 3, further comprising:
   a guide tube disposed within the spindle between the wire feeder and the guide roller on the spindle axis.

5. The spindle attachment of claim 1, wherein the wire feeder comprises:
   a motor; and
   at least one feeder wheel powered by the motor, the at least one feeder wheel configured to engage the wire extending from the material supply and to draw the wire from the material supply and through the spindle.

6. The spindle attachment of claim 5, wherein the wire feeder further comprises:
   at least one idler wheel disposed on an opposite side of the spindle axis from the at least one feeder wheel, the at least one idler wheel configured to maintain the wire on the at least one feeder wheel.

7. The spindle attachment of claim 5, wherein the wire feeder further comprises:
   a drive gear disposed between the motor and the at least one feeder wheel, the drive gear configured to provide rotational power to the feeder wheel from the motor.

8. The spindle attachment of claim 5, wherein the wire feeder further comprises:
   a balance weight disposed within the spindle opposite the motor.

9. The spindle attachment of claim 1, wherein:
   the angular bearing is disposed between the spindle and the static assembly proximate the application tip of the spindle, and wherein the angular bearing is configured to radially support and axially support the spindle relative to the spindle axis.

10. The spindle attachment of claim 1, further comprising:
    a balance ring extending around the upper portion of the spindle and disposed proximate the material supply.

11. The spindle attachment of claim 1, further comprising:
    a drive pulley disposed on a portion of the spindle extending out of the static assembly.

12. A computer numerical control machine system comprising:
    a work area configured to house a workpiece to be shaped into a final configuration;
    a plurality of spindle attachments configured to shape the workpiece, wherein at least one of the spindle attachments comprises:
       a static assembly; and
       a rotating assembly mounted on and extending through the static assembly, the rotating assembly comprising:
          a spindle having an upper end and an application tip, wherein the spindle extends through the static assembly and the application tip projects out of a lower end of the static assembly, the spindle configured to rotate on a spindle axis relative to the static assembly;

a material supply mounted on the spindle to rotate with the spindle, the material supply configured to store a feedstock of a wire; and a wire feeder disposed within the spindle, the wire feeder configured to engage the wire extending from the material supply and to draw the wire from the material supply and through the spindle;

wherein the spindle is movable along the spindle axis to adjust a position of a portion of the wire extending from the application tip relative to a substrate;

wherein the spindle is configured to rotate on the spindle axis relative to the static assembly to generate frictional heat between the portion of the wire extending from the application tip and the substrate to cause the wire to plasticize; and wherein a cooling jacket is disposed between the wire and an angular bearing and the cooling jacket circumferentially surrounds a portion of the wire coaxial with the spindle axis;

a machine spindle configured to attach to and manipulate a position and rotation of the plurality of spindle attachments; and a controller communicatively connected to the machine spindle, the controller configured to receive and store the final configuration in a memory and to control the machine spindle to shape the workpiece into the final configuration.

13. The computer numerical control machine system of claim 12, further comprising:

at least one sensor disposed in the at least one of the spindle attachments, the at least one sensor configured to sense an operating characteristic of the wire and to communicate the operating characteristic to the controller.

14. The computer numerical control machine system of claim 12, the material supply comprising:

a bracket mounted on the upper end of the spindle; and a reel rotatably supported on the bracket, wherein the wire is disposed on the reel;

wherein a guide roller is disposed within the spindle;

wherein a guide tube disposed within the spindle and on the spindle axis between the wire feeder and the guide roller; and wherein the wire extends through the guide roller and the guide tube between the reel and the wire feeder.

15. The computer numerical control machine system of claim 12, wherein the wire feeder comprises:

a motor;

at least one feeder wheel powered by the motor, the at least one feeder wheel configured to engage the wire extending from the material supply and to draw the wire from the material supply and through the spindle; and at least one idler wheel disposed on an opposite side of the spindle axis from the at least one feeder wheel, the at least one idler wheel configured to maintain an engagement of the wire and the at least one feeder wheel.

16. The computer numerical control machine system of claim 12, wherein:

the cooling jacket is disposed at the application tip of the spindle; and the angular bearing is disposed between the spindle and the static assembly proximate the application tip of the spindle, the angular bearing configured to both radially and axially support the spindle.

* * * * *